(12) United States Patent
McDowell

(10) Patent No.: US 9,279,271 B2
(45) Date of Patent: Mar. 8, 2016

(54) CONNECTED FENCE FOR COLLECTING RAIN WATER

(71) Applicant: Kenneth Vernon McDowell, Rohnert Park, CA (US)

(72) Inventor: Kenneth Vernon McDowell, Rohnert Park, CA (US)

( * ) Notice: Subject to any disclaimer, the term of this patent is extended or adjusted under 35 U.S.C. 154(b) by 0 days.

(21) Appl. No.: 14/322,843

(22) Filed: Jul. 2, 2014

(65) Prior Publication Data
US 2015/0247299 A1 Sep. 3, 2015

Related U.S. Application Data

(60) Provisional application No. 61/946,526, filed on Feb. 28, 2014.

(51) Int. Cl.
| | | |
|---|---|---|
| *E03B 3/03* | (2006.01) | |
| *E04H 17/00* | (2006.01) | |
| *E03B 1/04* | (2006.01) | |
| *E04H 17/16* | (2006.01) | |

(52) U.S. Cl.
CPC ...... *E04H 17/00* (2013.01); *E03B 1/04* (2013.01); *E03B 2001/047* (2013.01); *E04H 17/16* (2013.01)

(58) Field of Classification Search
CPC ....... E03B 3/03; E03B 2001/047; E03B 1/04; E04H 17/00; E04H 17/16
See application file for complete search history.

(56) References Cited

U.S. PATENT DOCUMENTS

| | | | | |
|---|---|---|---|---|
| 4,193,584 A | * | 3/1980 | Wieser | 256/19 |
| 5,730,179 A | * | 3/1998 | Taylor | 137/357 |
| 5,873,383 A | * | 2/1999 | Takai et al. | 137/357 |
| 6,059,491 A | * | 5/2000 | Striefel et al. | 405/111 |
| 6,341,445 B1 | * | 1/2002 | Morrison | 47/33 |
| 6,526,699 B1 | * | 3/2003 | Foglio, Sr. | 52/15 |
| 8,074,405 B1 | * | 12/2011 | Anchondo | 52/168 |
| 8,474,195 B1 | * | 7/2013 | Anchondo | 52/168 |
| 2006/0150531 A1 | * | 7/2006 | Cann | 52/11 |
| 2012/0000546 A1 | * | 1/2012 | Lewis | 137/15.01 |
| 2014/0034152 A1 | | 2/2014 | Drummond | |

FOREIGN PATENT DOCUMENTS

| | | | | |
|---|---|---|---|---|
| GB | 2366831 A | * | 3/2002 | |
| WO | WO 93/11310 | * | 6/1993 | |

OTHER PUBLICATIONS

TJB Inc., Modular Rainwater Tank Fence; Jul. 2012.*

* cited by examiner

*Primary Examiner* — Benjamin Fiorello
(74) *Attorney, Agent, or Firm* — Plager Schack LLP

(57) ABSTRACT

Some embodiments of the present disclosure include a water collecting fence for collecting, storing, and dispensing rain water. The fence may include a plurality of water containing fence sections, each section being connected to at least one adjacent section by a connector hose. Each section may include a water containing shell. The shell may have an interior defined by a top surface, a bottom surface, a pair of panel sides, and a pair of side surfaces; a fill hole and a vent hole each positioned on the top surface; a post extending downwardly from the shell, the post configured to secure the shell into a ground surface; a lower orifice proximate to the bottom surface; a lower plug or a hose attachment configured to engage with the lower orifice. At least one of the sections may be configured to engage with a gutter downspout from a building.

9 Claims, 4 Drawing Sheets

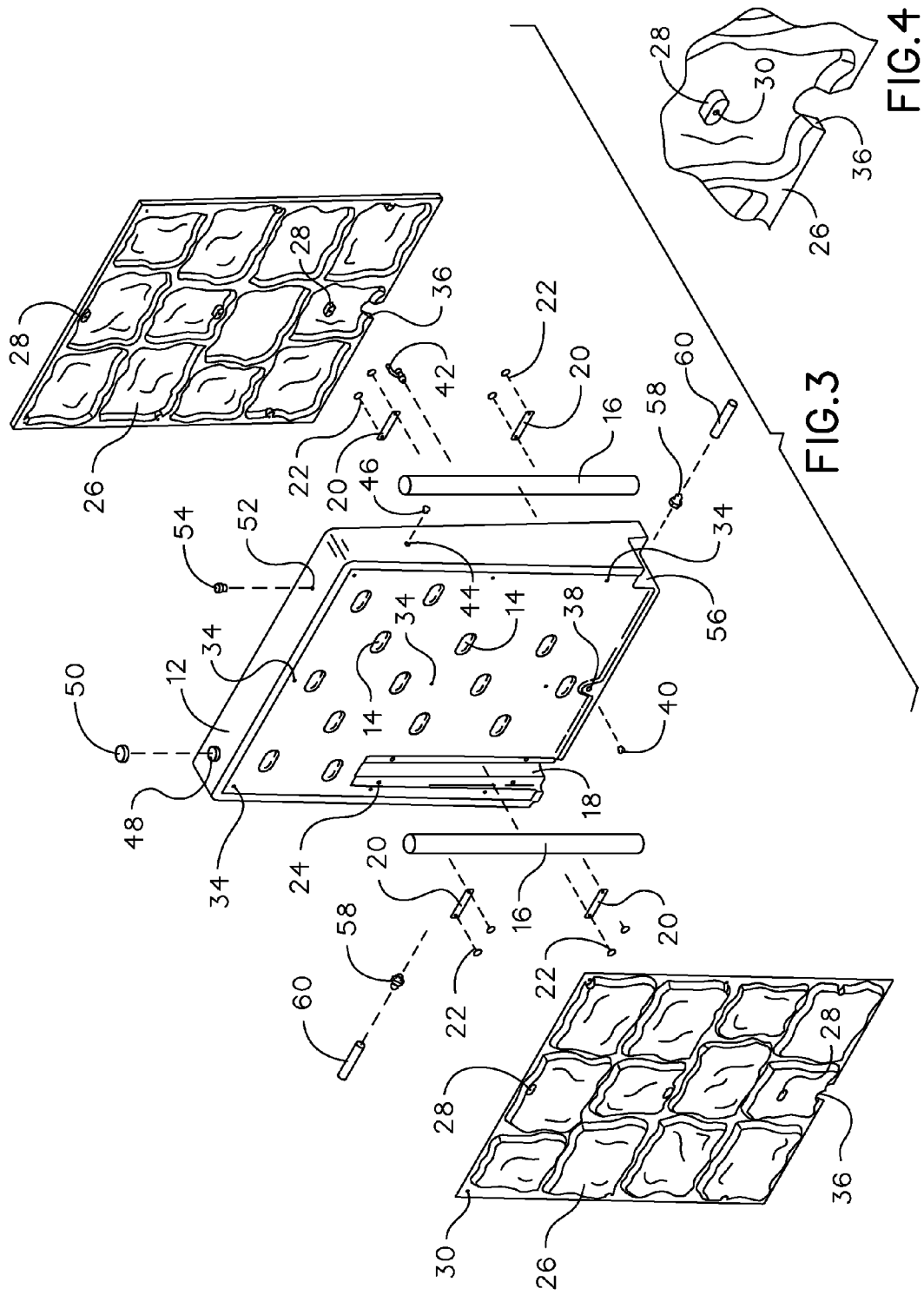

CONNECTED FENCE FOR COLLECTING RAIN WATER

RELATED APPLICATION

This application claims priority to provisional patent application U.S. Ser. No. 61/946,526 filed on Feb. 28, 2014, the entire contents of which is herein incorporated by reference.

BACKGROUND

The embodiments herein relate generally to water conservation and storage devices, and more particularly, to a connected fence for collecting, storing, and dispersing rain water.

Water shortages and droughts have been striking many areas of the country and the world recently. Conventional conservation techniques include limiting the use of water, but many conservation techniques do not include a sufficient way to collect, store, and use rain water.

Additionally, many people desire to have fences surrounding their yard or a portion of their yard. Traditionally, many fences are made from wood, which depletes the tree population.

Therefore, what is needed is a fence that is configured to collect, store, and disperse water, potentially storing thousands of gallons of water a year.

SUMMARY

Some embodiments of the present disclosure include a water collecting fence for collecting, storing, and dispensing rain water. The fence may include a plurality of water containing fence sections, each section being connected to at least one adjacent section by a connector hose. Each section may include a water containing shell. The shell may have an interior defined by a top surface, a bottom surface, a pair of panel sides, and a pair of side surfaces; a fill hole and a vent hole each positioned on the top surface; a post extending downwardly from the shell, the post configured to secure the shell into a ground surface; a lower orifice proximate to the bottom surface; a lower plug or a hose attachment configured to engage with the lower orifice. At least one of the sections may be configured to engage with a gutter downspout from a building.

BRIEF DESCRIPTION OF THE FIGURES

The detailed description of some embodiments of the invention is made below with reference to the accompanying figures, wherein like numerals represent corresponding parts of the figures.

FIG. 3 is an exploded view of one embodiment of the present invention.

FIG. 4 is a detailed rear perspective view of one embodiment of the present invention.

DETAILED DESCRIPTION OF CERTAIN EMBODIMENTS

Figure 1:
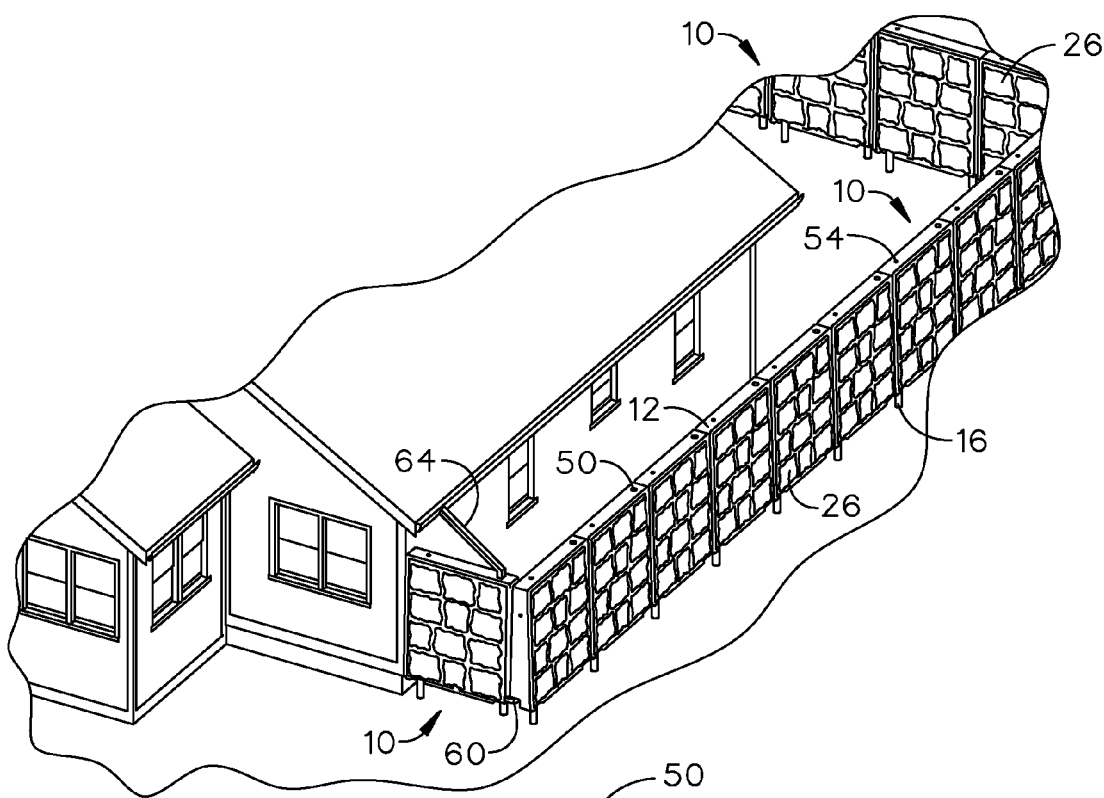
FIG. 1 is a perspective view of on embodiment of the present invention, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a fence configured to collect, store, and disperse rain water and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Water Collecting Fence Section
2. Water Containing Shell
3. Posts
4. Connector Hose The various elements of the fence for collecting, storing, and dispersing rain water of the present disclosure may be related in the following exemplary fashion. It is not intended to limit the scope or nature of the relationships between the various elements and the following examples are presented as illustrative examples only.

By way of example, and referring to FIGS. 1-8, some embodiments of the pet bed cover of the present disclosure comprise a water collecting fence section 10 comprising a water containing shell 12 configured to accept, store, and disperse a volume of rain water, at least one post 16 attached to the water containing shell 12, the post 16 configured to secure the water containing shell 12 to the ground, and a connector hose 20 configured to attach a first water collecting fence section 10 with an adjacent water collecting fence section 10, wherein water 66 may flow from the first water collecting fence section 12 to a second water collecting fence section 12.

Figure 2:
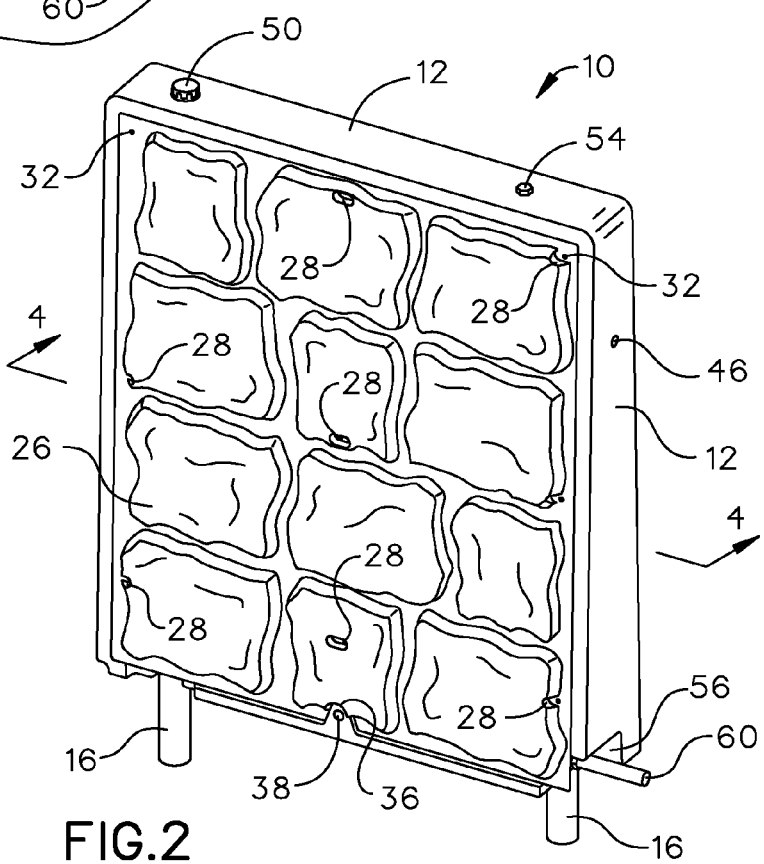
FIG. 2 is a perspective view of one embodiment of the present invention.
Figure 7:
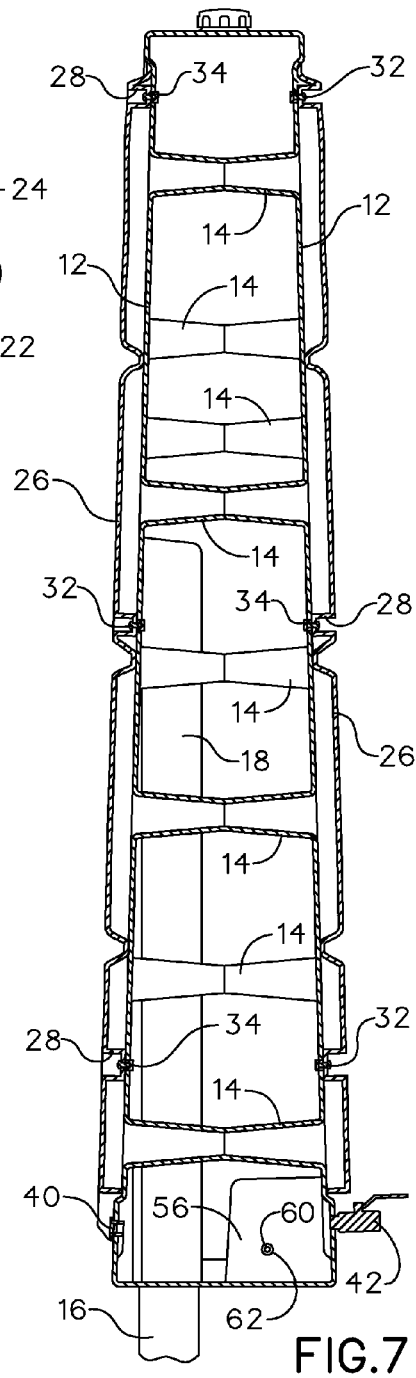
FIG. 7 is a section view of one embodiment of the present invention, taken along line 7-7 in FIG. 5.

In embodiments, the water containing shell 12 may have a bottom surface configured to be positioned proximate to the ground and a top surface configured to face upwards toward the sky, a pair of side surface extending downward from the top surface to the bottom surface, and a pair of panel sides extending downwardly from the top surface to the bottom surface, wherein the side surface of adjacent water containing shells 12 face each other and the panel sides are the surfaces of the fence visible to a user when the fence has been installed, the surfaces defining the interior of the water containing shell 12. The top surface may comprise a fill hole 48, which may be sealed with fill cap 50, and a vent hole 52, which may be sealed with vent cap 54. In embodiments, the fill hole 48 may be aligned with a gutter downspout 64 from a building, wherein the gutter downspout 64 is configured to guide rain water 66 from the roof and gutters of the building into the interior of the water containing shell 12 using the fill hole 48. As shown in FIGS. 2, 3, and 7, the width of the water containing shell 12 may taper from a smaller width to a larger width from the top surface to the bottom surface. In other words, the width of the water containing shell 12 may be larger proximate to the bottom surface than at the top surface.

The water containing shell 12 may have a first panel side opposite a second panel side, wherein each of the panel sides extends downwardly from the top surface to the bottom surface. In some embodiments, each of the panel sides may have at least one decorative panel 26 removably attached thereto. For example, the panel sides may have a plurality of screw inserts 34, and the decorative panel 26 each comprise a panel screw recess 28 configured to align with the screw inserts 34, such that the decorative panel 26 may be removably attached to the panel sides using a panel screw 32. In some embodiments, the panel sides may further comprise a lower orifice 38 positioned proximate to the bottom surface of the water containing shell 12, wherein the lower orifice 38 may be used to disperse water 66 from the interior of the water containing shell 12. In embodiments, a hose attachment 42 may be attached to the lower orifice 38 such that a hose may be attached to the water containing shell 12. Alternatively, a lower plug 40 may be used to seal the lower orifice 38. The decorative panel 26, if used, may also comprise a lower panel cutout 36 configured to align with the lower orifice 38.

Additionally, each of the panel sides may comprise a post slot 18 configured to accept a post 16, wherein the post 16 is used to secure the water collecting fence section 10 to the ground. The post 16 may be secured into the post slot 18 using, for example, a post strap 20 and a plurality of strap bolts 22, which may engage with a plurality of bolt inserts 24 on the panel sides. Alternatively, the post 16 may be secured using any other conventional mechanism. In embodiments, the post 16 may be substantially cylindrical, wherein each water containing shell 12 is attached to a plurality, such as two, posts 16, as shown in the figures. Alternatively, the post 16 may be substantially u-shaped, such that a single post 16 would be attached to two post slots 18. In embodiments, adjacent water collecting sections 12 may share a single post 16.

The side surfaces of the water containing shell 12 may comprise a side hole 44, which may be sealed with a side plug 46. Additionally, in an area proximate to a bottom corner of the side surface and panel side may be positioned a connector hole notch 56 comprising a connector fitting 58 comprising a connector fitting hole 62, wherein a first end of the connector fitting 58 is configured to extend through the wall of the water containing shell 12 and a second end of the connector fitting 58 is configured to be removably attached to a connector hose 60, wherein the connector hose 60 is configured to similarly attach to the connector fitting 58 of the adjacent water containing shell 12. In some embodiments, the connector hole notch 56 may be protected by an access panel once the fence sections are connected.

Figure 5:
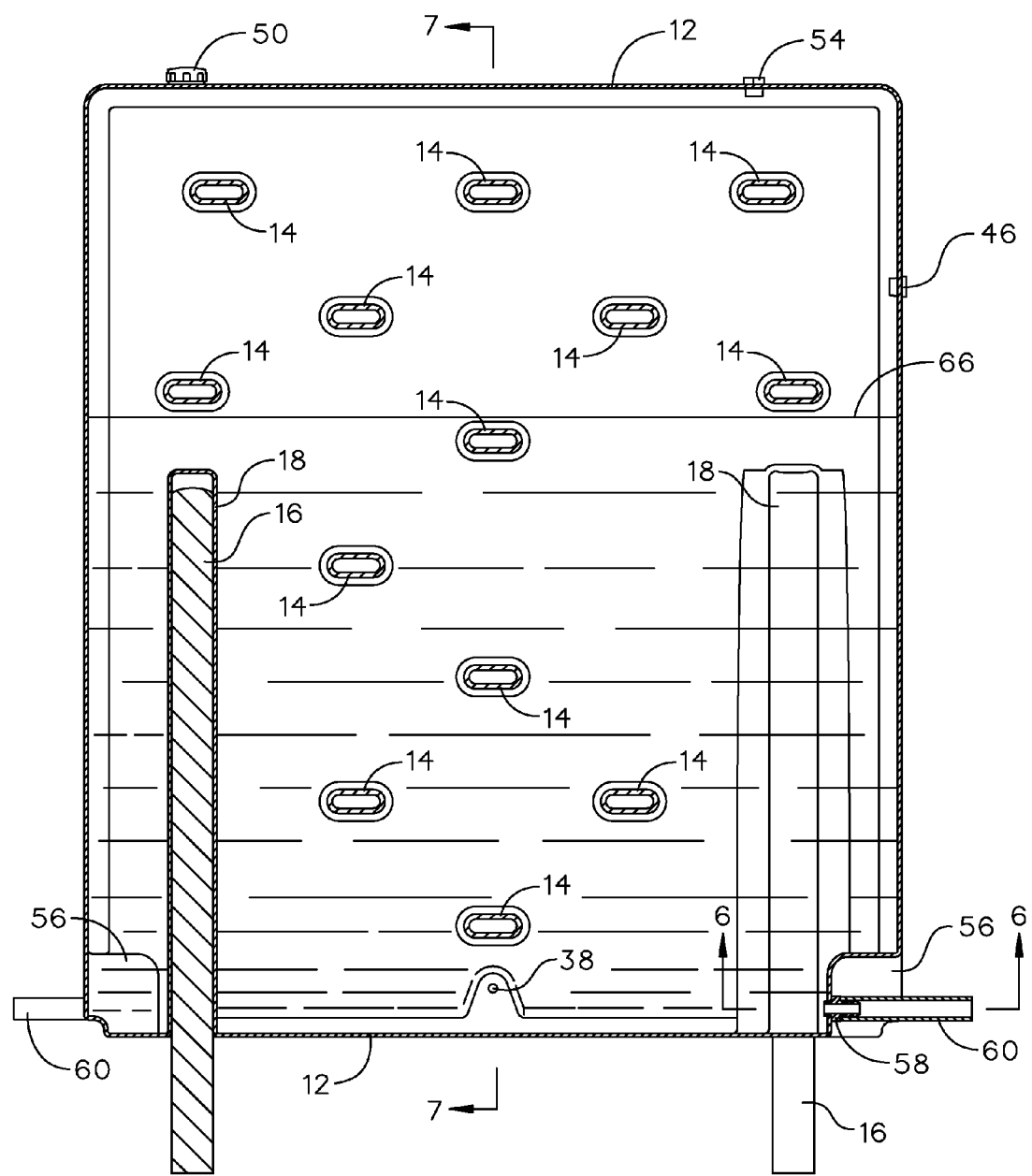
FIG. 5 is a section view of one embodiment of the present invention, taken along line 5-5 in FIG. 2.
Figure 6:
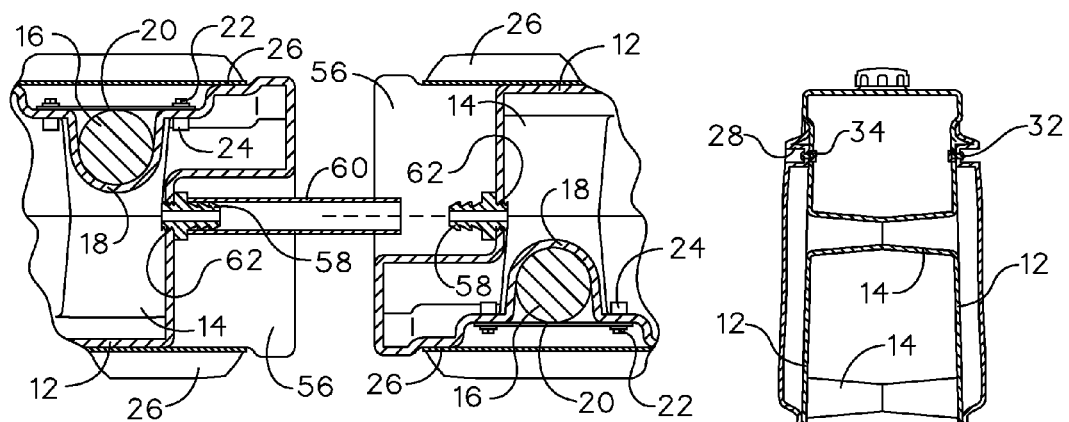
FIG. 6 is a detail section view of one embodiment of the present invention, taken along line 6-6 in FIG. 5.
Figure 8:
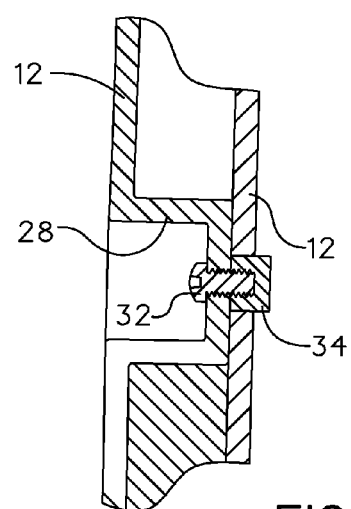
FIG. 8 is a detail section view of one embodiment of the present invention.

In embodiments, the water containing shell 12 may also comprise a plurality of shell ribs 14, as shown in FIGS. 5-7. The shell ribs 14 may extend from one panel side, through the interior of the water containing shell 12, to the other panel side, wherein the shell ribs 14 may provide the water containing shell with improved stability.

In some embodiments, the water collecting fence of the present invention may further comprise a pump operatively attached to a roof sprinkler system, wherein the pump may be either automatically or manually activated when needed, such as when there is a fire.

To use the invention of the present disclosure, a user may assembly a plurality of water collecting fence sections 10 together in a desired shape or pattern, as shown in FIG. 1, with at least one of the water collecting fence sections 10 being configured to engage with the gutter downspout 64. Alternatively, the water collecting fence may not be configured to engage with a gutter downspout 64; rather, the fill caps on each of the water containing shells 12 may simply be removed, allowing rain water to fall into the water containing shells. To dispense water from the water collecting fence sections 10, a user may simply attach a hose to the lower orifice 38, letting gravity provide the water pressure needed to force the water out of the water containing shells 12 into the hose.

In embodiments, the water collecting fence sections 10 may be made of any suitable materials. In some embodiments, the water containing shells may comprise high density polyethylene (HDPE), in which case, the water collecting fence may also act as a fire barrier. The connector hoses 60 may be made of any suitable material, such as silicon tubing. In embodiments, the water collecting fence may withstand up to 80 mph winds and may be seismically sound. The decorative panels may comprise any desired decorative material, such as stone, wood, bricks, imitation stone, imitation wood, or the like. Each water collecting fence section 10 may have any desired size and, in some embodiments, is about 7 feet tall and about 6 feet long, with an upper width of about 10 inches and a lower width of about 15½ inches. Additionally, each water collecting fence section 10 may hold in excess of 320 gallons of water.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A water collecting fence section for collecting, storing, and dispensing rain water, the water collecting fence section comprising:
    a water containing shell comprising an interior defined by a top surface, a bottom surface, a pair of panel sides, and a pair of side surfaces;
    a post slot arranged into each panel side open ended at the front and at the bottom;
    a fill hole and a vent hole each positioned on the top surface of the water containing shell;
    a post, inserted into each post slot wherein the post is encircled by the post slot and against a distal end of the post slot; wherein the post is configured to secure the water containing shell into a ground surface; and
    a connector hose extending outwardly from the water containing shell, the connector hose configured to attach the water containing shell to an adjacent water containing shell.

2. The water collecting fence section of claim 1, wherein a width of the water collecting fence section tapers from a smallest width proximate to the top surface to a largest width proximate to the bottom surface.

3. The water collecting fence section of claim 1, further comprising a decorative panel configured to removably attach to the panel sides.

4. The water collecting fence section of claim 1, wherein:
    the water containing shell further comprises a lower orifice proximate to the bottom surface; and
    one member selected from the group consisting of a lower plug and a hose attachment configured to engage with the lower orifice.

5. The water collecting fence section of claim 1, further comprising a plurality of shell ribs positioned in the interior of the water containing shell and extending from a first panel side to a second panel side while being offset horizontally and vertically from one another.

6. The water collecting fence section of claim 1, wherein the fill hole is configured to engage with a gutter downspout from a building.

7. The water collecting fence section of claim 1, wherein the post is secured by a post strap and a plurality of strap bolts.

8. A water collecting fence for collecting, storing, and dispensing rain water, the water collecting fence comprising:
a plurality of water collecting fence sections, each water collecting fence section being connected to at least one adjacent water collecting fence section by a connector hose, wherein each water collecting fence section comprises:
a water containing shell comprising an interior defined by a top surface, a bottom surface, a pair of panel sides, and a pair of side surfaces;
a post slot arranged into each panel side;
a fill hole and a vent hole each positioned on the top surface of the water containing shell;
a post, inserted into each post slot wherein the post is encircled by the post slot and against a distal end of the post slot; wherein the post is configured to secure the water containing shell into a ground surface; and
a lower orifice proximate to the bottom surface; and
one member selected from the group consisting of a lower plug and a hose attachment configured to engage with the lower orifice, wherein
at least one of the plurality of water collecting fence sections is configured to engage with a gutter downspout from a building.

9. The water collecting fence of claim 8, wherein the fence can withstands winds of at least 80 mph and is seismically sound.

* * * * *